Figure 1:
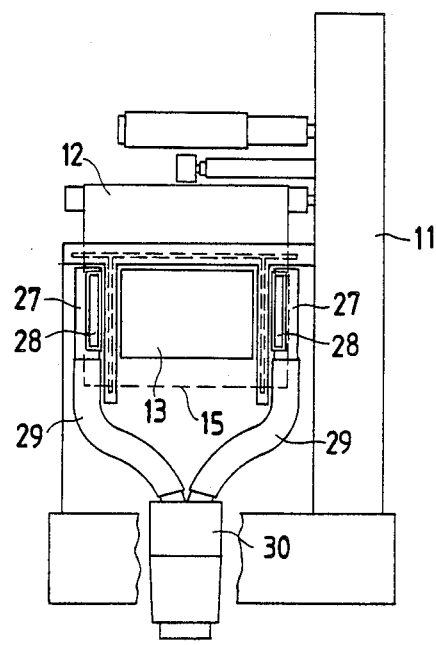

United States Patent [19]

Ballestrazzi et al.

[11] Patent Number: 4,964,263
[45] Date of Patent: Oct. 23, 1990

[54] PACKAGING MACHINE EQUIPPED WITH AN IMPROVED WELDING AND CUTTING DEVICE

[75] Inventors: Aris Ballestrazzi; Lamberto Tassi, both of Savignano sul Panaro, Italy

[73] Assignee: Sitma, S.p.A., Spilamberto, Italy

[21] Appl. No.: 315,729

[22] Filed: Feb. 24, 1989

[30] Foreign Application Priority Data

Mar. 1, 1988 [IT] Italy ................... 19598 A/88

[51] Int. Cl.⁵ .................. B65B 7/06; B65B 51/22
[52] U.S. Cl. ........................ 53/555; 53/372; 53/373
[58] Field of Search ........... 53/228, 372, 373, 553, 53/554, 555

[56] References Cited

U.S. PATENT DOCUMENTS

| | | | |
|---|---|---|---|
| 3,011,295 | 12/1961 | Brugger | 53/372 |
| 3,273,307 | 9/1966 | Burt | 53/228 |
| 3,333,395 | 8/1967 | Doucette et al. | 53/555 |
| 3,340,678 | 12/1967 | Rhodes | 53/373 |
| 3,665,673 | 5/1972 | Billet et al. | 53/555 X |
| 3,748,811 | 7/1973 | Cox | 53/553 X |
| 3,991,540 | 11/1976 | Ballestrazzi et al. | 53/228 X |
| 4,115,182 | 9/1978 | Wildmoser | 53/228 X |
| 4,182,096 | 1/1980 | Ballestrazzi et al. | 53/553 |
| 4,683,708 | 8/1987 | Linder | 53/553 X |

FOREIGN PATENT DOCUMENTS

| | | | |
|---|---|---|---|
| 2205834 | 8/1973 | Fed. Rep. of Germany | 53/555 |
| 1019877 | 2/1966 | United Kingdom | 53/555 |

Primary Examiner—Robert L. Spruill
Assistant Examiner—Beth Bianca
Attorney, Agent, or Firm—Hedman, Gibson, Costigan & Hoare

[57] ABSTRACT

A packaging machine, in which the packaging is carried out of products fed by free-falling inside a cradle-shaped length of a packaging material, which is provided with a welding/cutting device for welding and cutting opposite edges of packaging material, is capable of accomplishing a continuous weld on three sides of the product-containing packaging material, and of removing ear-shaped scrap portions of said packaging material, generated by the weld.

4 Claims, 4 Drawing Sheets

PACKAGING MACHINE EQUIPPED WITH AN IMPROVED WELDING AND CUTTING DEVICE

The present invention relates to a packaging machine equipped with an improved welding and cutting device.

Packaging machines are known, in which the product to be packaged is fed by free (gravity) falling into a cradle-shaped length of a packaging material, unwound from two opposite bobbins. The cradle-shaped length of packaging material partially wraps the product and, once that a suitable unwinding of packaging material is accomplished, a welding and cutting device finishes the pack, or package, with simultaneously restoring the continuity of the material unwound from both bobbins, which is therefore ready to receive the subsequent unit of product which is being fed.

A so-structured packaging machine causes a pack, or package, to be formed, which, precisely owing to the type of welding device, shows two welds oriented in the transversal direction relatively to the fed packaging material, in the nearby of the peripheral area which constrains the product, and two welds oriented in the longitudinal direction relatively to the packaging material fed, accomplished side-by-side to the packaged product, and such as to generate a pair of longitudinal, extended portions of packaging materials not engaged by the product, and positioned side-by-side relatively to said product. More precisely, during each operating cycle of the device, essentially one single transversal welding is carried out, which, on the other hand, by acting as a so-said "weld-cutter" determines the sealing of the finished pack, and simultaneously restores the continuity of the packaging material which in being unwound from both bobbins.

These extended longitudinal portions of packaging material form two side "ears" in the finished pack which, if they are left on the same pack, give it an aesthetically objectionable appearance, furthermore causing handling problems, as well as operating problems in case the pack has to undergo successive processing steps. If, on the contrary, said side "ears" have to be removed, first of all quasi-intersecting transversal welds and longitudinal welds have to provided, in order to facilitate the separation of said "ears" of packaging material from the finished pack, with a removal of the same "ears" once that said pack is finished and evacuated from the packaging machine, being simultaneously prearranged, or provided.

In this case too, the above-said "ears", or material appendices generated by the packaging welding generate handling problems during the treatment steps when the finished pack leaves, or after it has left, the packaging machine.

The purpose of the present invention is of solving the above cited problems by means of a packaging machine which is capable of accomplishing product packs, in which the product to be packaged is fed to a cradle-shaped length of packaging material, and said length of packaging material is welded along its periphery, and which, simultaneously to the formation of the pack, is capable of removing side "ears" from said pack.

This purpose according to the present invention is achieved by providing a packaging machine equipped with an improved welding and cutting device, of the type comprising at least in combination a product-feeding means, in order to stepwise feed, by free falling, a product to be packaged to a cradle-shaped length formed from a packaging material which is being unwound from at least two bobbins, supported in opposite positions relatively to said cradle-shaped length of packaging material, sensor means suitable for selectively controlling the unwinding of said at least two bobbins, operatively connected with a motor means for reciprocating a welding and cutting device, with said welding and cutting device comprising blade elements and counter-blade elements movable respectively to each other, such as to carry out at least one transversal welding, and at least two longitudinal weldings in the nearby of free side longitudinal and transversal edges of said cradle-shaped length of packaging material, characterized in that sucking elements designed for sucking side end portions of said cradle-shaped length of packaging material, defined by the welding/cutting action of said blade and counter-blade elements are provided side-by-side to at least one of said blade and counter-blade elements, at least in the nearby of portions thereof which are suitable for carrying out said longitudinal weldings.

Figure 2:
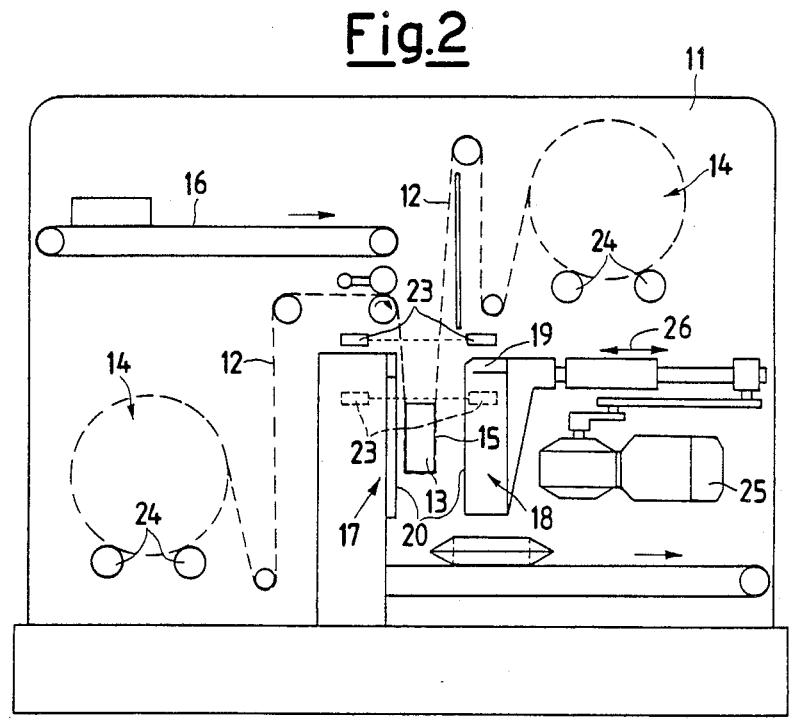
Figure 3:
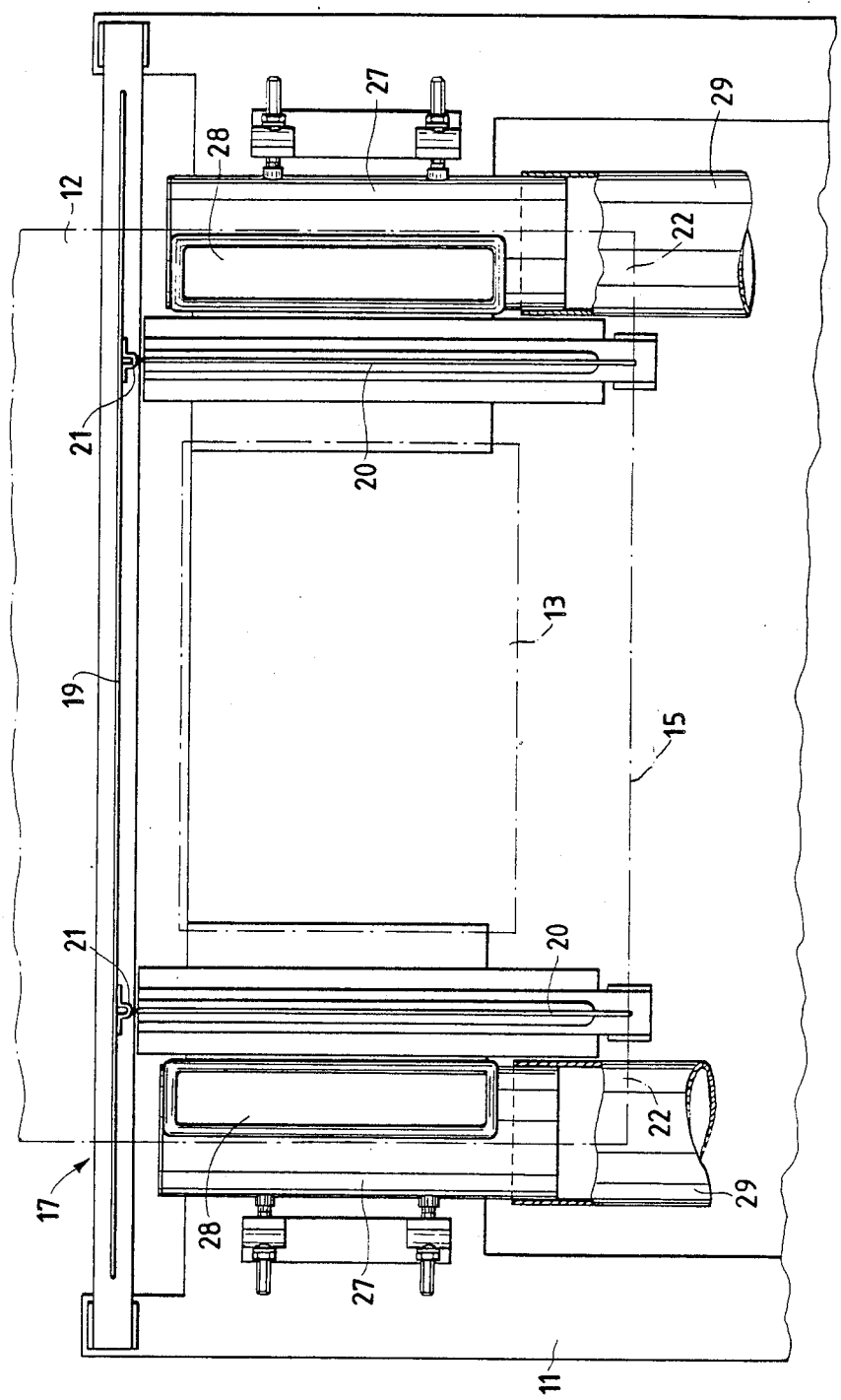
Figure 4:
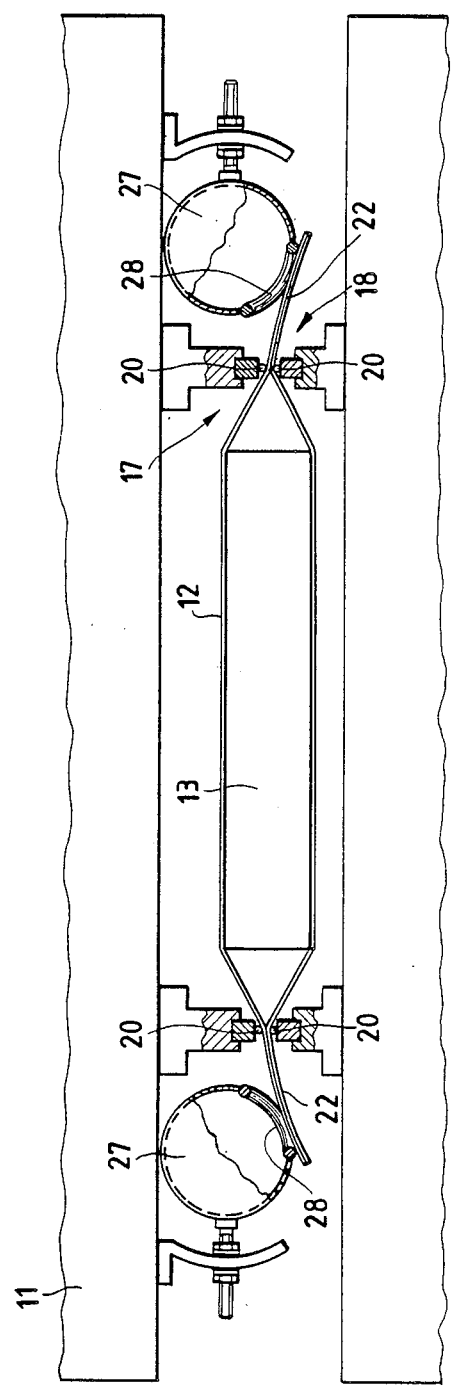
Figure 6:
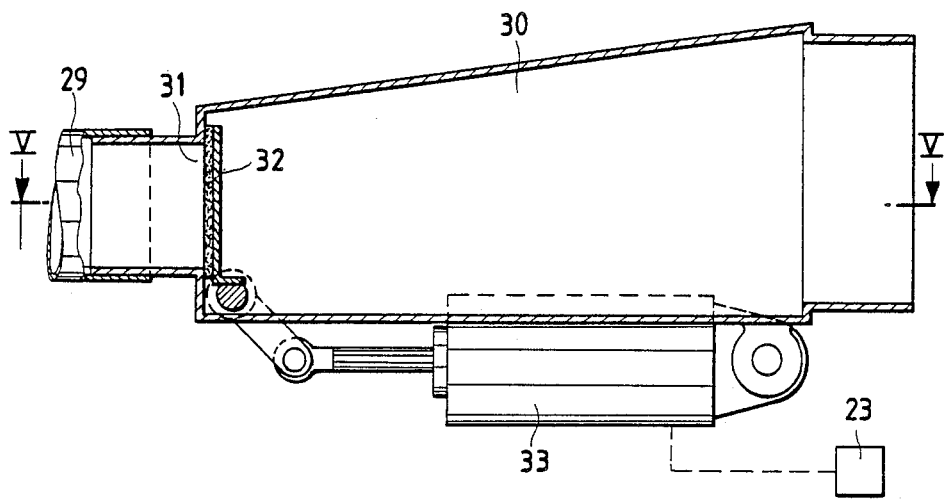
Figure 5:
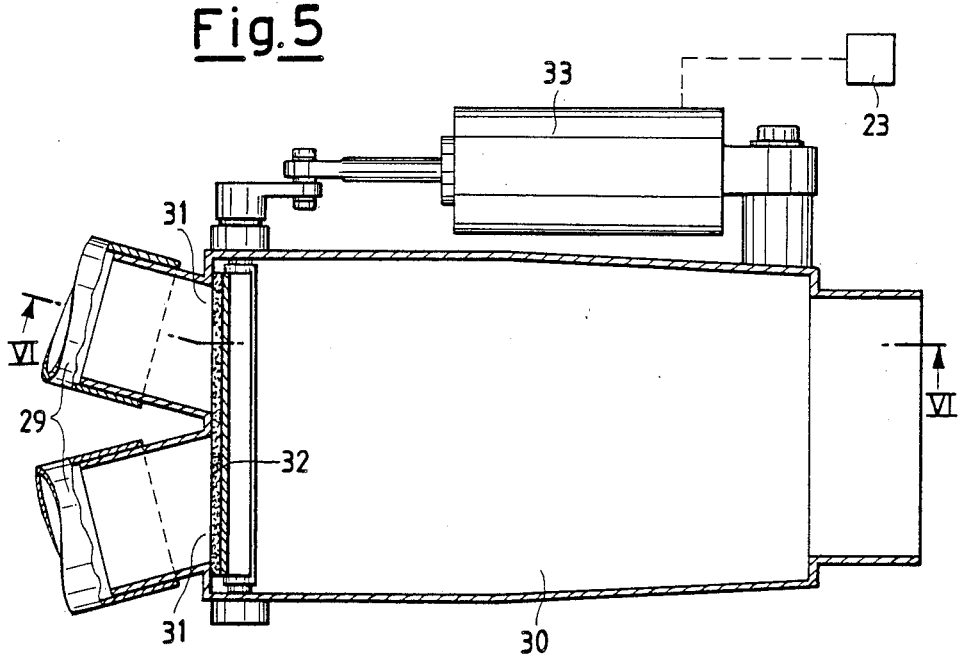

The structural and functional characteristics and the advantages of a packaging machine equipped with an improved welding and cutting device according to the present invention will result more clearly from the following exemplifying, non-limitative disclosure, referred to the relevant drawings, in which:

FIG. 1 shows a side elevation view of a machine according to the present invention, FIG. 2 shows a transversal sectional view of a detail of the welding and cutting device in its open position, FIG. 3 shows a magnified partially sectional view of the welding and cutting device as shown in FIG. 1, FIG. 4 shows a partially sectional plan view, FIG. 5 shows a sectional view of the sucking device of the machine according to the invention, made along the path line V—V of FIG. 6, and FIG. 6 shows a sectional view according to path line VI—VI of the sucking element of FIG. 5.

Referring to FIG. 1, a portion of a packaging machine is schematically shown, in which, mounted on a casing 11, a welding and cutting device for a packaging material 12 containing a product schematically shown in 13, is provided. The packaging material 12, such as, e.g., a plastic film, is unwound from two bobbins 14, supported on the casing 11 in an opposite position relatively to the welding and cutting device, and, in correspondence of said welding and cutting device, defines a cradle-shaped length, indicated by the reference numeral 15, inside which the product 13 enters, which is, e.g., stepwise fed under free-falling conditions by a feeder means 16, such as a conveyor belt.

On the casing 11 a welding and cutting device is furthermore installed, as hereinabove said, in correspondence of the region in which said cradle-shaped length 15 of packaging material is formed, which welding and cutting device essentially comprises blade elements 17 and counter-blade elements 18, respectively acting as a stationary blade and as a mobile counter-blade, which can be driven to carry out to-and-fro movements, so as to accomplish the pack.

Both said blade element 17 and counter-blade element 18 comprise an upper horizontal portion 19, which extends throughout the transversal width of the packaging material 12, and at least two longitudinal, vertical, side portions 20, perpendicularly extending from the upper horizontal portion 19 downwards. According to the particular, advantageous arrangement according to the present invention, in the areas of intersection between the upper horizontal portion 19 and the longitudinal side portions 20 an omega-shaped element 21 is provided, which is operatively connected with said upper horizontal transversal portion 19.

In the herein depicted example, the blade element and the counter-blade element are constituted by wire resistors, and any fortuitous contacts between the transversal blade portion and the longitudinal blade portions, which would cause the welding/cutting unit to become unserviceable, has to be prevented. On the other hand, said portions of the blade or/and counter-blade elements have to be installed as close to each other as possible, in order to facilitate the subsequent operations of separation of side end portions 22 of said cradle-shaped length 15, which are generated by the welding-/cutting action performed by said blade elements 17 and counter-blade elements 18.

Preferably, in correspondence of said cradle-shaped length 15 and of side welding/cutting device, sensor means 23 for the selective actuation of unwinding means 24 which control the unwinding of the bobbins 14, and of a motor means 25 for reciprocating said movable counter-blade elements 18—with said motor means 25 reciprocating as shown by the arrow 26—are provided.

Flanked to said longitudinal side portions 20 on said stationary blade element 17, or on the casing 11, two sucking elements 27 are installed, which sucking elements 27 are given the shape of cylindrical box-like elements, provided with a large port 28 on their side surface, so positioned as to result to be in correspondence of said side end portions 22.

Both sucking elements 27 are connected through ducts 29 with a central exhausting manifold 30 connected, in continuous, with an exhauster (nor shown in the figures). Inlet ports 31 of said central manifold 30 are selectively closed by a pivotally swinging shutter wall 32 driven by an actuator cylinder 33, also operatively connected with said sensor means 23.

A packaging machine according to the present invention operates as follows.

The products 13 to be packed and packaged are fed by the conveyor belt 16 after each other, suitably spaced apart from each other, so as to be able to reach, by free falling, the interior of the cradle-shaped length 15 defined between the welding and cutting device 17, 18 in its open condition (FIG. 2).

The sensor means 23 detect the passage of the product 13, and consequently command the stopping of the conveyor belt 16, as well as the stopping of the bobbin unwinding means 24, with simultaneously activating the reciprocating motor means driving the movable counter-blade element 18.

As soon as the stationary blade element 17 and the movable counter-blade element 18 come into contact and the welding/cutting action is taking place, the sucking elements 27 are activated by opening the ports 31 of the central manifold 30.

The side end portions 22 of said cradle-shaped length 15, i.e., the "ears" generated by the welding/cutting action, are thus ultimately separated from the packed product 13, and are intaken into the interior of the sucking elements 27, running though the large ports 28.

This is of course facilitated according to the present invention by the particular positioning of the omega-shaped elements 21 on the areas of intersection between the upper horizontal portion 19 and the side longitudinal portions 20 of the blade and counter-blade elements 17, 18.

The above-said suction action is carried out during an extremely short time, such as to make it possible the side end, scrap, portions 22 to be removed, after which the actuator cylinder 33 moves the shutter wall 32 back into its shut position, and the packing and packaging cycle continues.

Advantageously, the suction can favour the cooling of the welds, as well as the stability of the so-accomplished pack.

In this way, according to the present invention the problem is solved of obtaining a perfectly finished pack, free from unnecessary packaging material, with the presence of said superfluous scrap packaging material, which could in some way prevent the packaged product from being correctly handled inside the packaging machine being simultaneously eliminated.

We claim:

1. A packaging machine for packaging products, comprising:
   (a) product feeding means for delivering the product to the packaging machine;
   (b) at least two bobbins connected to the packaging machine wherein said bobbins have packaging material, and wherein said packaging material is unwound and supported from said bobbins for forming a cradle shape for receiving the product;
   (c) sensor means for controlling the unwinding of said packaging material from said bobbins;
   (d) welding and cutting means including blade and counterbalde elements respectively moveable to each other for simultaneously making at least one transverse welding and at least two longitudinal weldings for sealing said packaging material around the product for forming a sealed package wherein said sealed package has end portions, and simultaneously cutting off said end portions from said sealed package;
   (e) motor means for reciprocatingly moving said welding and cutting means;
   (f) a sucking element connected to the machine and located proximate to said blade and counterblade elements for sucking said cut end portions away from said sealed package;
   (g) a central exhaust manifold having ports; and
   (h) means for activating said sucking element, wherein said sucking element further comprises box-like elements having a port, wherein said sucking element is connected to said central exhaust manifold by means of a duct, and wherein said activating means includes a shutter wall for shutting said port of said central exhaust manifold and said sensor means includes an actuator wherein said shutter wall is pivotally connected for swinging and actuated by said actuator of said sensor means.

2. A packaging machine for packaging products, comprising:
   (a) product feeding means for delivering the product to the packaging machine;
   (b) at least two bobbins connected to the packaging machine wherein said bobbins having packaging material, and wherein said packaging material is unwound and supported from said bobbins for forming a cradle shape for receiving the product;
   (c) sensor means for controlling the unwinding of said packaging material from said bobbins;

(d) welding and cutting means including blade and counterblade elements respectively moveable to each other for simultaneously making at least one transverse welding and at least two longitudinal weldings for sealing said packaging material around the product for forming a sealed package wherein said sealed package has end portions, and simultaneously cutting off said end portions from said sealed package, wherein said blade and said counterblade elements further comprise an upper horizontal portion which is transversely positioned relative to said packaging material and at least two longitudinal side portions perpendicularly depending from said upper horizontal portion and omega shaped elements for operatively connecting said longitudinal side portions with said upper horizontal portion;

(e) motor means for reciprocatingly moving said welding and cutting means; and (f) a sucking element connected to the machine and located proximate to said blade and counterblade elements for sucking said cut end portions away from said sealed package.

3. A packaging machine for packaging products, comprising:

(a) product feeding means for delivering the product to the packaging machine;

(b) at least two bobbins connected to the packaging machine wherein said bobbins have packaging material, and wherein said packaging material is unwound and supported from said bobbins for forming a cradle shape for receiving the product;

(c) sensor means for controlling the unwinding of said packaging material from said bobbins;

(d) welding and cutting means including blade and counterblade elements respectively moveable to each other for simultaneously making at least one transverse welding and at least two longitudinal weldings for sealing said packaging material around the product for forming a sealed package wherein said sealed package has end portions, and simultaneously cutting off said end portions from said sealed package, wherein said blade and said counterblade elements further comprise an upper horizontal portion which is transversely positioned relative to said packaging material and at least two longitudinal side portions perpendicularly depending from said upper horizontal portion and omega shaped elements for operatively connecting said longitudinal side portions with said upper horizontal portion;

(e) motor means for reciprocatingly moving said welding and cutting means;

(f) a sucking element connected to the machine and located proximate to said blade and counterblade elements for sucking said cut end portions away from said sealed package;

(g) a central exhaust manifold having ports; and (h) means for activating said sucking element, wherein said sucking element further comprises box-like elements having a port, wherein said sucking element is connected to said central exhaust manifold by means of a duct.

4. A packaging machine for packaging products, comprising:

(a) product feeding means for delivering the product to the packaging machine;

(b) at least two bobbins connected to the packaging machine wherein said bobbins have packaging material, and wherein said packaging material is unwound and supported from said bobbins for forming a cradle shape for receiving the product;

(c) sensor means for controlling the unwinding of said packaging material from said bobbins;

(d) welding and cutting means including blade and counterblade elements respectively moveable to each other for simultaneously making at least one transverse welding and at least two longitudinal weldings for sealing said packaging material around the product for forming a sealed package wherein said sealed package has end portions, and simultaneously cutting off said end portions from said sealed package, wherein said blade and said counterblade elements further comprise an upper horizontal portion which is transversely positioned relative to said packaging material and at least two longitudinal side portions perpendicularly depending from said upper horizontal portion and omega shaped elements for operatively connecting said longitudinal side portions with said upper horizontal portion;

(e) motor means for reciprocatingly moving said welding and cutting means;

(f) a sucking element connected to the machine and located proximate to said blade and counterblade elements for sucking said cut end portions away from said sealed package;

(g) a central exhaust manifold having ports; and (h) means for activating said sucking element, wherein said sucking element further comprises box-like elements having a port, wherein said sucking element is connected to said central exhaust manifold by means of a duct, wherein said activating means includes a shutter wall for shutting said port of said central exhaust manifold and said sensor means includes an actuator wherein said shutter wall is pivotally connected for swinging and actuated by said actuator of said sensor means.

* * * * *